United States Patent
Gomm et al.

(10) Patent No.: US 7,136,157 B2
(45) Date of Patent: Nov. 14, 2006

(54) METHOD AND APPARATUS FOR TESTING IMAGE SENSORS

(75) Inventors: Tyler J. Gomm, Meridian, ID (US); Jeff D. Bruce, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 288 days.

(21) Appl. No.: 10/645,620

(22) Filed: Aug. 22, 2003

(65) Prior Publication Data

US 2005/0041242 A1 Feb. 24, 2005

(51) Int. Cl.
G01N 21/00 (2006.01)
(52) U.S. Cl. .................... 356/237.1; 348/187
(58) Field of Classification Search ............. 356/237.1; 348/187–188
See application file for complete search history.

(56) References Cited

U.S. PATENT DOCUMENTS

| 4,648,695 | A | | 3/1987 | Mizutani et al. |
| 5,120,960 | A | * | 6/1992 | Halvis ................. 250/338.4 |
| 5,448,395 | A | * | 9/1995 | Lopez et al. ............. 359/224 |
| 5,457,493 | A | * | 10/1995 | Leddy et al. ............. 348/181 |
| 5,467,128 | A | | 11/1995 | Yates et al. |
| 5,596,185 | A | * | 1/1997 | Bross et al. ............. 250/208.1 |
| 5,694,053 | A | * | 12/1997 | Smith ..................... 324/770 |
| 5,803,570 | A | | 9/1998 | Chen et al. |
| 6,618,076 | B1 | * | 9/2003 | Sukthankar et al. ....... 348/180 |
| 2004/0108448 | A1 | * | 6/2004 | Bosser .................... 250/252.1 |

FOREIGN PATENT DOCUMENTS

EP 03216566 9/1991
EP 1 303 147 A1 4/2003

OTHER PUBLICATIONS

Brian T. Teipen et al., Liquid-crystal-display projector-based modulation transfer function measurements of charge-coupled-device video camera systems, Applied Optics, Feb. 1, 2000, p. 515, vol. 39, No. 4.
Yokogawa, Image Sensor Test System TS6600, Online 2000, http://www.yokogawa.com/tsl/si/soc/6600/ts-soc6600-00len030521.htm (retrieved Dec. 3, 2004).
Michael R. Douglas, DMD reliability: a MEMS success story, SPIE Proceedings, Jan. 1, 2003, p. 1, vol. 4980.
Kauffmann, A; The Characteristics of CCD colour cameras and their measurement, Database Inspec, Online, The Institution of Electrical Engineers, Mar. 1988, pp. 72-82, vol. 32.

* cited by examiner

Primary Examiner—Gregory J. Toatley, Jr.
Assistant Examiner—Kara Geisel
(74) Attorney, Agent, or Firm—Dickstein Shapiro LLP

(57) ABSTRACT

Methods and apparatuses for testing image sensors are disclosed. Desirable apparatuses of the present invention include image sensor testing devices comprising a digital light projection system capable of projecting static or dynamic images onto an image sensing device under test and an image sensor signal detection means for analyzing the output of said image sensing device under test. The digital light projection system comprises a light source, collimating optics, a digital micromirror device, and focusing optics. Other desirable methods and apparatuses of the present invention include image sensor testing devices employing a digital light projection system capable of simultaneously testing a plurality of image sensors. According to the present invention, the light source is calibrated and converted to a desired test image by the digital micromirror device. The test image is then focused onto an image sensor, the output of which is read by a detector and correlated with the input digital test image.

29 Claims, 8 Drawing Sheets

METHOD AND APPARATUS FOR TESTING IMAGE SENSORS

FIELD OF THE INVENTION

This invention relates generally to a method and apparatus for testing image sensors and, more particularly, to a method and apparatus for the automated testing of a single image sensor or a plurality of image sensors using both static and dynamic test patterns.

BACKGROUND OF THE INVENTION

A conventional image sensor is composed of an array of individual light sensitive circuits called pixels that are organized in rows and columns. A row of pixels has a common line connecting the control gates of their respective access transistors. Data is passed from a pixel through its access transistor to a data line. Each column of pixels is connected to a common data line.

There are a number of different types of semiconductor-based imagers including charge coupled devices (CCD), photodiode arrays, and complementary metal-oxide semiconductor (CMOS) imagers. A CMOS imager circuit, for example, includes a focal plane array of pixel cells; each cell includes a photosensor, for example, a photogate, photoconductor or a photodiode overlying a substrate for producing a photo-generated charge in a doped region of the substrate. A readout circuit is provided for each pixel cell and includes at least a source follower transistor and a row select transistor for coupling the source follower transistor to a column output line. The pixel cell also typically has a floating diffusion node, connected to the gate of the source follower transistor. Charge generated by the photosensor is sent to the floating diffusion node. The imager may also include a transistor for transferring charge from the photosensor to the floating diffusion node and another transistor for resetting the floating diffusion node to a predetermined charge level prior to charge transference.

In a CMOS imager pixel cell, for example, a four transistor (4T) pixel, all the active elements of a pixel cell perform the necessary functions of (1) photon to charge conversion; (2) transfer of charge to the floating diffusion node; (3) resetting the floating diffusion node to a known state before the transfer of charge to it; (4) selection of a pixel cell for readout; and (5) output and amplification of a signal representing a reset voltage and a pixel signal voltage based on the photo converted charges. A three transistor (3T) pixel circuit operates similarly, but omits a transfer transistor for transferring charge from the photosensor to the floating diffusion region and couples the floating diffusion region and photosensor together.

CMOS imagers are generally known and are discussed, for example, in Nixon et al., "256×256 CMOS Active Pixel Sensor Camera-on-a-Chip," IEEE Journal of Solid-State Circuits, Vol. 31(12) pp. 2046–2050, 1996; Mendis et al, "CMOS Active Pixel Image Sensors," IEEE Transactions on Electron Devices, Vol. 41(3) pp. 452–453, 1994 as well as U.S. Pat. Nos. 5,708,263 and 5,471,515, all of which are herein incorporated by reference.

FIG. 1 illustrates a block diagram of a conventional CMOS imager device 908 having an array 200 of pixel cells, which may be 3 transistor, 4 transistor or pixels using other numbers of transistors. Pixel cell array 200 comprises a plurality of pixel cells arranged in a predetermined number of columns and rows. The pixel cells of each row in array 200 are all turned on at the same time by a row select line, and the pixel cells of each column are selectively output by respective column select lines. The row lines are selectively activated by the row driver 210 in response to row address decoder 220 and the column select lines are selectively activated by the column driver 260 in response to column address decoder 270. The CMOS imager is operated by the control circuit 250 that controls address decoders 220, 270 for selecting the appropriate row and column lines for pixel operation and readout, and row and column driver circuitry 210, 260 that apply driving voltage to the drive transistors of the selected row and column lines. The pixel column signals, which typically each include a pixel reset signal $V_{rst}$ and a pixel image signal $V_{sig}$, for a pixel cell selectively connected to a column line are read by a sample and hold circuit 265 associated with the column driver 260 and are subtracted by amplifier 267 to form a differential signal $V_{rst}-V_{sig}$ for each pixel cell which is amplified and then digitized by analog to digital converter 275. The analog to digital converter 275 converts the received analog pixel signals to digital signals, which are fed to an image processor 280 to form a digital image.

The operation of the charge collection of the CMOS imager is known in the art and is described in several publications such as Mendis et al., "Progress in CMOS Active Pixel Image Sensors," SPIE Vol.2172, pp. 19–29 1994; Mendis et al., "CMOS Active Pixel Image Sensors for Highly Integrated Imaging Systems," IEEE Journal of Solid State Circuits, Vol. 32(2), 1997; and Eric R, Fossum, "CMOS Image Sensors: Electronic Camera on a Chip," IEDM Vol. 95 pages 17–25 (1995) as well as other publications. These references are incorporated herein by reference.

Exemplary CMOS imaging circuits, processing steps thereof, and detailed descriptions of the functions of various CMOS elements of an imaging circuit are described, for example, in U.S. Pat. No. 6,140,630 to Rhodes, U.S. Pat. No. 6,376,868 to Rhodes, U.S. Pat. No. 6,310,366 to Rhodes et al., U.S. Pat. No. 6,326,652 to Rhodes, U.S. Pat. No. 6,204,524 to Rhodes, and U.S. Pat. No. 6,333,205 to Rhodes. The disclosures of each of the forgoing are hereby incorporated by reference herein in their entirety.

Image sensor pixel arrays, such as the CMOS imager described above, are subject to various failing mechanisms, which ultimately result in a defective imagers. For example, pixel arrays can be short circuited or open circuited during fabrication and therefore may not perform their proper function. In order to overcome these problems and select arrays that are acceptable for use, defects in the array must be detected.

Image sensor arrays, such as the CMOS imager described above, have traditionally been tested using a calibrated, static light source. Typically, during production testing, an image sensor would be exposed to light of varying intensity ranging from black to white. Measurements are taken to determine the response of the array. The accuracy of this method of testing image sensors, however, is a concern. For example, if two neighboring pixels were shorted together during the manufacturing process, the measured output would be the same as if the pixels were not shorted together. This occurs because both pixels have been exposed to the same intensity of light during the test. The defect may go undetected until the device is placed in a system and tested under "real world" conditions.

Defect detection is especially difficult when it is dependent on human observation of the output as displayed on the viewing device (e.g. a cathode ray tube or liquid crystal display panel). For example, when photons strike an image sensor, such as the CMOS imager described above, the photosensitive region of the sensor converts the photons into current that is subsequently converted via a digital to analog converter into a 10 bit word for viewing by an observer. As the number of pixels on an integrated circuit expands, it becomes increasingly difficult for a human to detect faults. Special training is required for the human observers; and even then, human interpretation plays a major role in the determination of acceptable products. Unfortunately, humans lack consistent observational skills due to their very nature and varying levels of alertness throughout the day. Therefore, this type of testing is not acceptable for high volume, cost sensitive, image sensor products.

Other image sensor testing techniques have problems as well. For example, when image sensors are tested using static test images, care must be taken to align adjacent light and dark potions of the test images with adjacent rows or columns of pixels. This alignment process can be difficult and time consuming. Furthermore, static test images are not capable of testing an image sensor for various failing mechanisms across the entire pixel array.

Therefore, there is a need and desire for an automated apparatus and method of efficiently testing an entire array of image sensors that overcomes the shortcomings of conventional testing techniques.

BRIEF SUMMARY OF THE INVENTION

Embodiments of the present invention provide apparatuses and methods for testing image sensors using a digital light projection system to generate static and dynamic test images.

Embodiments of the present invention include a testing device comprising a digital light projection system capable of projecting a high-resolution static or dynamic test image onto an image sensing device under test and an image sensor signal detection means for analyzing the output of said image sensing device under test. The digital light projection system further comprises collimating optics, a digital micromirror device, and focusing optics. Other desirable apparatuses of the present invention include image sensor testing devices employing a digital light projection system capable of projecting a static or dynamic test image onto a plurality of image sensor devices under test.

In one embodiment of the present invention, an image sensor testing apparatus employing a digital light projection system is used to project a high resolution static image onto an image sensor device under test. The digital light projection system comprises a light source, collimating optics, digital micromirror device, and focusing optics. The light source is calibrated and converted to a desired test image by the digital micromirror device using a pulse-width modulation technique. The test image is then focused onto an image sensor circuit array of an image sensor device under test, the output of which is read by an image sensor signal detection means and correlated with the input digital test image.

In another embodiment of the present invention, an image sensor testing apparatus employing a digital light projection system as described above is used to project a dynamic test image, which is projected onto an image sensing device under test. The image is then marched across an image sensor circuit array of an image sensor device under test, the output of which is read by an image sensor signal detection means and correlated with the input digital test image.

In yet another embodiment of the present invention, an image sensor testing apparatus employing a digital light projection system as described above is used to project either static or dynamic test images onto the image sensor circuit arrays of a plurality of image sensor devices under test.

The present invention is particularly useful for testing a wide variety of image sensor failing mechanisms and for automating the image sensor testing process.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 1:
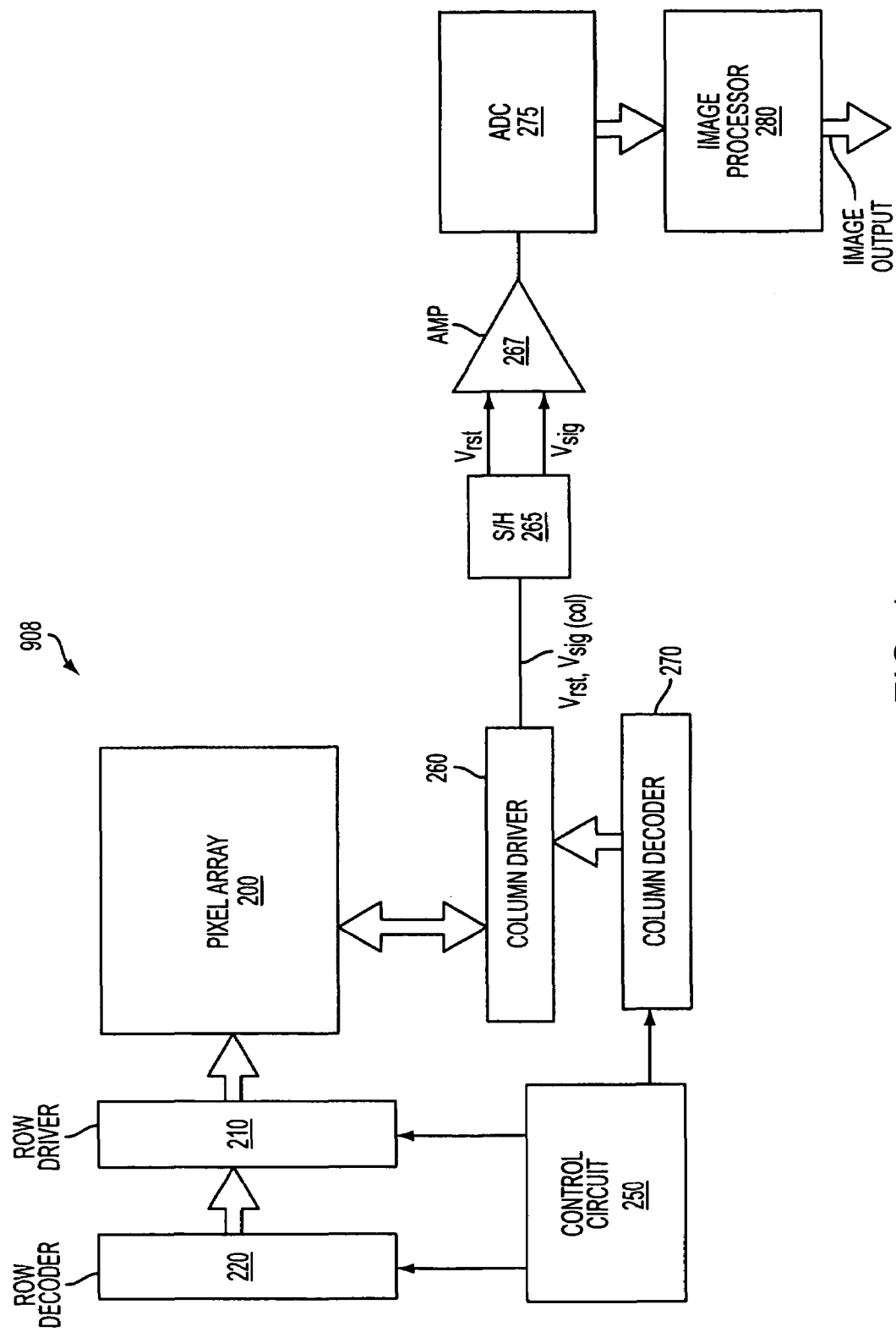
FIG. 1 is a block diagram of a conventional CMOS imager.
Figure 2:
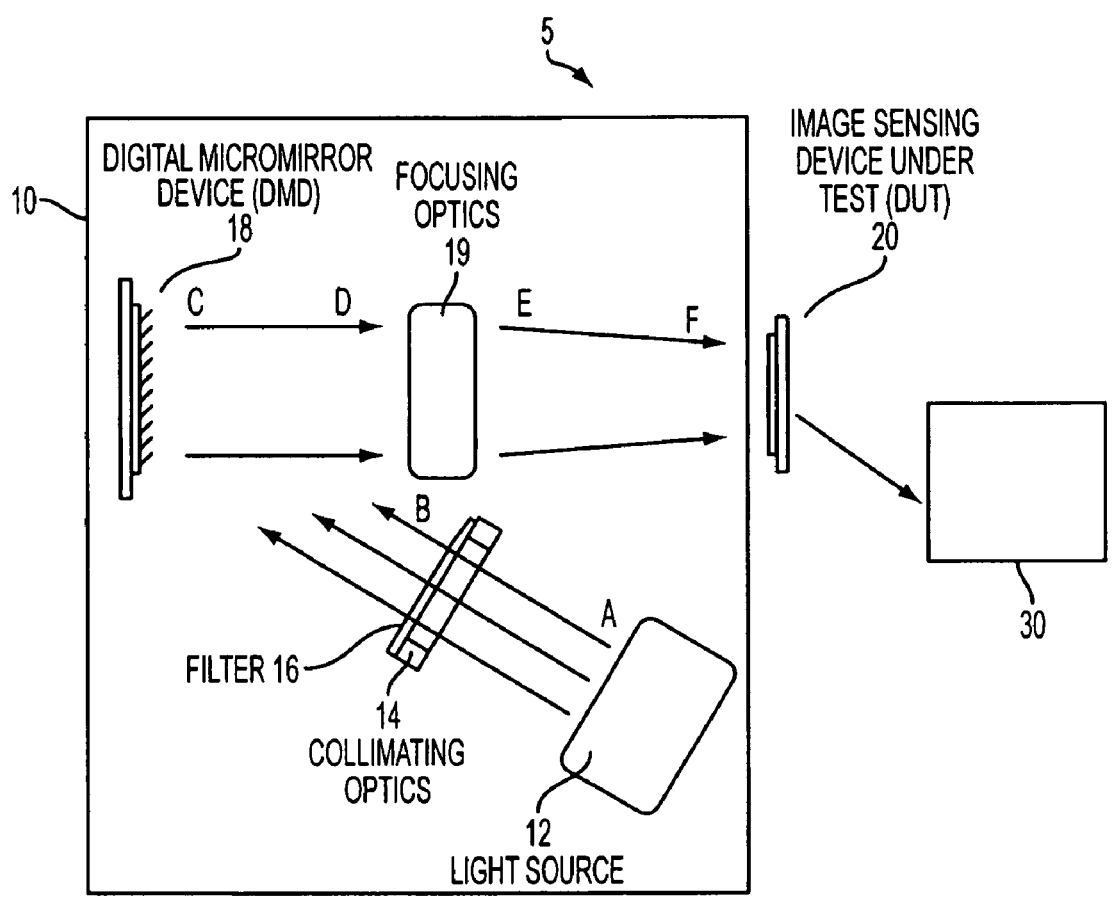
FIG. 2 is a diagram of an exemplary image sensor testing apparatus according to one embodiment of the invention.

FIG. 2 is a representation of the image sensor testing apparatus according to a first exemplary embodiment of the present invention. The apparatus 5 comprises a digital light processing system (DLPS) 10 capable of projecting high-resolution images onto an image sensing device under test (DUT) 20, such as the CMOS imager described above, and an image sensor signal detector 30 capable of reading the output of the DUT 20. The DLPS 10 is capable of creating various test patterns for the DUT 20, which allow testing of an entire imager pixel array.

As shown in FIG. 2, the digital light processing system 10 consists of a light source 12, collimating optics 14, light filters 16, a digital micromirror device (DMD) 18, focusing optics 19, and an image sensor signal detector 30. Exemplary light sources include uniform DC light sources having no more than 1% variation in intensity and wavelength during operation. Exemplary light filters include wavelength selection filters, for selecting a particular wavelength or wavelength band from the light source; IR cut filters, for filtering out Infrared light; and flattening filters, for dampening the intensity of the light source. The necessity of such filters, however, is dependent upon the desired test parameters for a particular device under test 20. Accordingly, such filters are not essential to the present invention and may be omitted. Furthermore, while the collimating optics 14 and filters 16 are shown as a single unit in FIG. 2, they may alternatively be two distinct units. The collimating optics 14 comprise a lens or series of lenses designed to direct light to the digital micromirror device 18. The focusing optics 19 comprise a lens or series of lenses designed to focus an image from the digital micromirror device 18 onto the device under test 20. Both the collimating optics 14 and focusing optics 19 of the present invention are well known in the art.

The image sensor signal detector 30 is a system such as an image acquisition card or frame grabbing card used in conjunction with a PC to receive outputted data from the device under test 20. Image sensor output is analyzed by the image sensor signal detector 30 by comparing the outputted signal to the inputted signal using data analysis software such as LabVIEW® or MATLAB®. Thus, the detection process is automated and human observational error in detecting image sensor defects is substantially eliminated.

According to a first exemplary embodiment of the present invention, light rays from the light source 12 are collimated by the collimator lens 14, which then directs the collimated light rays onto the digital micromirror device 18. The path of the light rays is indicated by arrows AB, CD, and EF in FIG. 2. If necessary, the collimated light rays may first pass through a filter 16 or series of filters that are positioned between the collimating optics 14 and the digital light processing system 18, as shown in FIG. 2. The light rays incident on the digital micromirror device 18 are converted to high-resolution images, which are then focused onto the device under test 20 via the focusing optics 19.

Figure 3A:
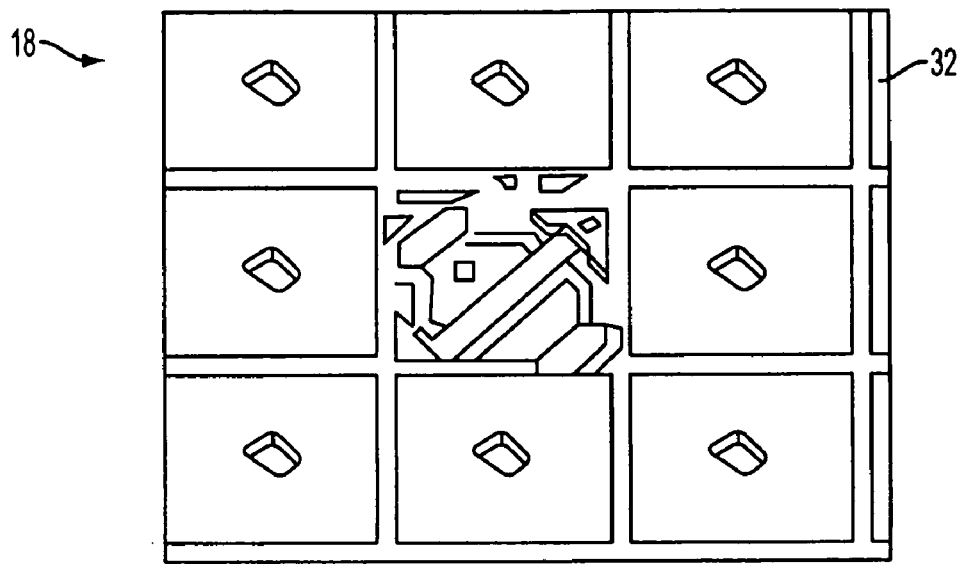
FIG. 3(a) is a rendering of a magnified section of a conventional digital micromirror device.
Figure 3B:
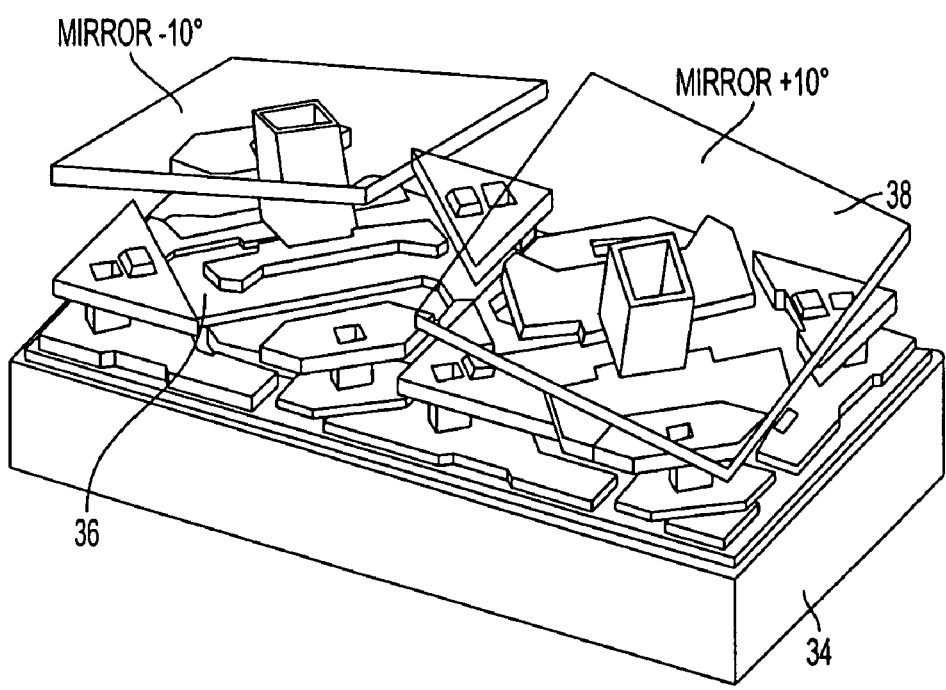
FIG. 3(b) is a rendering of two magnified individual micromirror devices.

The digital micromirror device 18, illustrated in FIG. 3(*a*), is the central component of the digital light processing system and consists of an array of thousands of tiny mirrors 32. Essentially, the mirrors 32 act as digital light switches that accept electrical words as their inputs and output optical words. Each mirror 32 in the digital micromirror device is approximately 16µ². These mirrors 32 consist of several layers including a memory cell 34, torsion hinge 36, and mirror portion 38, as illustrated in FIG. 3(*b*). Each mirror portion 38 is able to move into two states, +10 degrees for "on" or −10 degrees for "off" and thereby control an individual pixel of light on a device under test 20. Essentially, when a mirror portion 38 rotates to its on state, light from a light source is projected through the focusing optics and lights-up a corresponding pixel of the device under test. When the mirror portion 38 rotates to its off state, light from a projection source is projected away from the focusing optics and the corresponding pixel of the device under test remains dark.

During operation of the digital light processing system, a digital signal electrically addresses the memory cell 34 below each mirror portion 38 of the digital micromirror device. Responding to this electrical signal, each mirror portion 38 interacts with incident light from the light source as described above, with the input signal controlling how long each mirror stays in either the on or off state. Thus, the incident light is switched into time-modulated bundles, which are outputted to the device under test. This switching scheme is termed pulse-width modulation and is used to produce high resolution images, which, according to the present invention, are focused onto the device under test. This digital light processing technique is further described in Digital Light Processing and MEMS: Timely Convergence for a Bright Future, Proceedings SPIE, Vol.2639, Micromachining and Microfabrication, (1995), which is hereby incorporated by reference.

In a second exemplary embodiment of the present invention, the image sensor testing apparatus 105, as shown in FIG. 4(*a*) is capable of simultaneously testing a plurality of image sensing devices 20, using a single light projection system. Similar to the first exemplary embodiment described above, the second exemplary image sensor testing apparatus of the present invention employs a digital light processing system to create both static and dynamic images, but simultaneously focuses these images onto a plurality of devices under test 20. According to this exemplary embodiment, the digital micromirror device 18 of the digital light processing system 10 projects a single image over a plurality of adjacent devices under test 20. Thus, the resolution of the micromirror array must be greater than the total resolution of the devices under test. The devices under test may be aligned with space between each device, as any light from the digital light processing system that falls between the devices under test will not affect the test. The devices under test, however, must be aligned such that the edge between light and dark test image sections correspond to two adjacent pixel rows or columns on each device under test.

In a third exemplary embodiment of the present invention and similar to the second exemplary embodiment described above, the image sensor testing apparatus 205, as shown in FIG. 4(*b*), is capable of testing a plurality of image sensing devices using static or dynamic test images, but utilizes focusing optics 219 capable of splitting the test image received from the digital micromirror device 18 into a plurality of parallel test images and then focusing the test images onto a plurality devices under test 20. Accordingly, the image sensor testing apparatus generates at least one test image for each DUT 20 and then focuses single test image onto each DUT 20.

There are numerous failing mechanisms that can cause defects in an image sensor. Many of these failing mechanisms are related to the architecture of the pixel array of the image sensor. For example, adjacent pixels sharing row or column lines may become shorted together. This can be detected by comparing the response of two or more adjacent pixels at a light and dark edge of a test image. Non-adjacent pixels, however, may respond as if they are shorted together as well. For example, a test image projected onto a first section of an image sensor may cause a pixel in a second section of the array to light, even though no light from the test image was shown on the second section of the array. It is not always possible to explain why such non-adjacent pixels respond together nor is it always possible to predict which pixels across an array will exhibit this behavior. The method and apparatus of the present invention, however, is capable of detecting defects in both adjacent and non-adjacent pixels.

Figure 5:
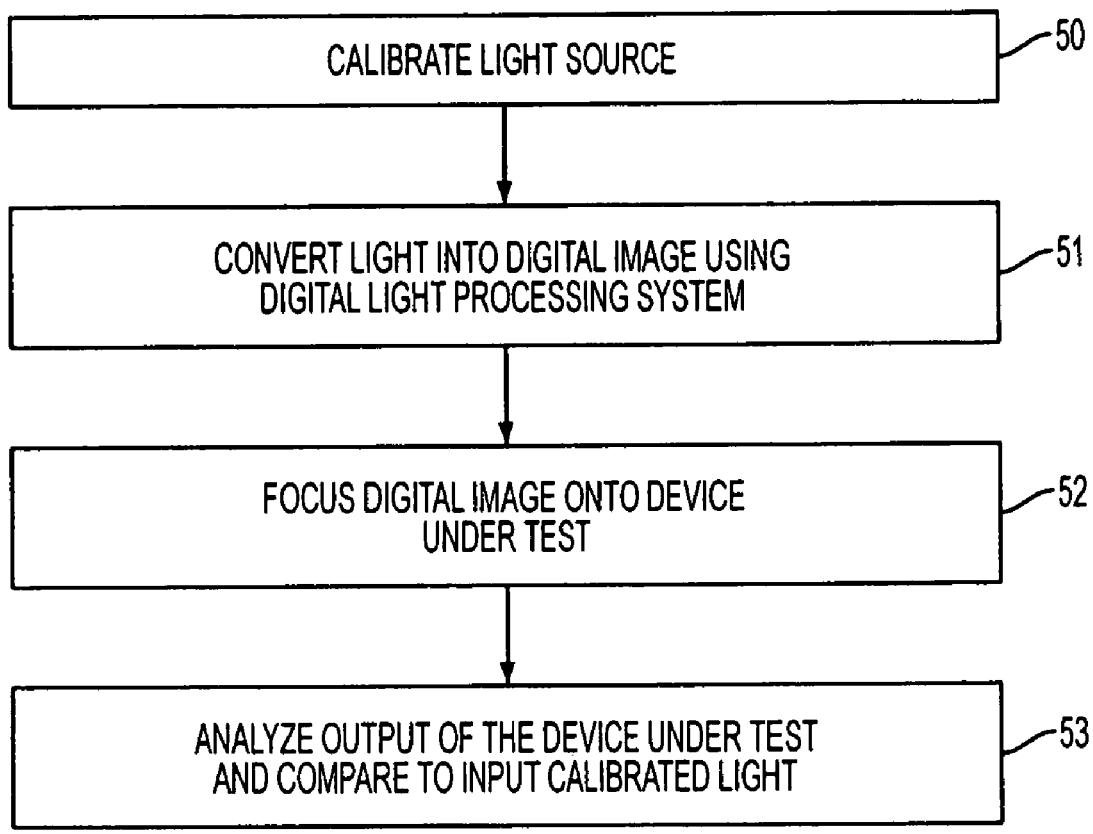
FIG. 5 is a block diagram of an exemplary method of testing image sensors according to the present invention.

FIG. 5 is a diagram illustrating a first exemplary method of testing image sensors according to a method embodiment the present invention. Referring now to FIG. 2 and FIG. 5, first, at FIG. 5 block 50, a light from the light source 12 is calibrated such that a known intensity of light is inputted to the digital micromirror device 18. Next, at block 51, the calibrated light is then converted to a desired digital image via the pulse-with modulation technique described above. As shown at block 52, this digital image is then focused onto a device under test 20, such as an array of pixel cells in a CMOS imager as described above. Finally, the output of the device under test 20 is then read as a voltage by the image sensor signal detection means 30 and compared to the amount of light input into the digital micromirror device 18, as shown at block 53. If a good correlation exists between the two, the device passes.

Use of a digital micromirror device to generate a test image as described above, for example, allows an image to be sent to a single pixel, producing a sharp contrast between a light pixel and adjacent dark pixels. For example, "A" amount of light is input to the digital micromirror device, which is programmed to transmit an image from the micromirror 32 at row/column address x, y to the corresponding x, y row/column pixel address on the device under test. If the output from the image sensor pixel at address x, y correlates to the amount of light "A" input to the digital micromirror device then the pixel passes. The present invention, however, is not limited to testing a single pixel at a time, but can be used to send a wide variety of test images, such as diagonals and checkerboards, to the device under test. Furthermore, the digital micromirror device can also be programmed to march the test image across each row/column of an image sensor pixel array, enabling the testing of the entire image sensing array of the device under test.

Referring again to FIG. 2, in the first exemplary method of testing image sensors according to the present invention, an image sensor testing apparatus 10, as described above, is used to project static test images on to a device under test 20. According to this exemplary method, a static test image or series of images having a dark image section next to a light image section are projected onto the device under test 20. The edge between the light and dark image sections is then aligned exactly between two adjacent pixel columns of the device under test 20. The image sensor signal detection means 30 then compares the response of two or more adjacent pixels at the light and dark edge of the image. Furthermore, any pixels across the entire array that are not located at the light and dark edge of the test image but nevertheless respond to the test image will also be detected.

In accordance with a second exemplary method embodiment of testing image sensors of the invention, the digital light processing system 18 sends dynamic test images to the device under test 20, allowing the entire array of image sensors to be tested. Exemplary dynamic test images include marching rows, marching diagonals, and alternating checkerboards. Use of these dynamic test images allows the detection of more failing mechanisms than using a static test image. For example, when a static test image as described above is used, only one combination of light and dark pixels residing on only a portion of the image sensor array of the device under test is used to test the array. Thus, only those failing mechanisms associated with that particular combination of light and dark pixels can be detected. When a dynamic test image is stepped across an image sensing array, however, multiple combinations of light and dark pixels are used to test the array. For example, failing mechanisms associated only with a particular combination of light and dark pixels can be detected by systematically lighting different combinations of pixels on the device under test 20 using a dynamic test image. Furthermore, by stepping images across the entire array, it is possible to test every pixel in the entire array, rather than just a portion of them. Finally, the ability to step the test image across the array negates the problem of having to align the edge between the light and dark image sections exactly between two adjacent pixel rows or columns of the device under test 20 and thus allows the testing process to become more automated.

Figure 4A:
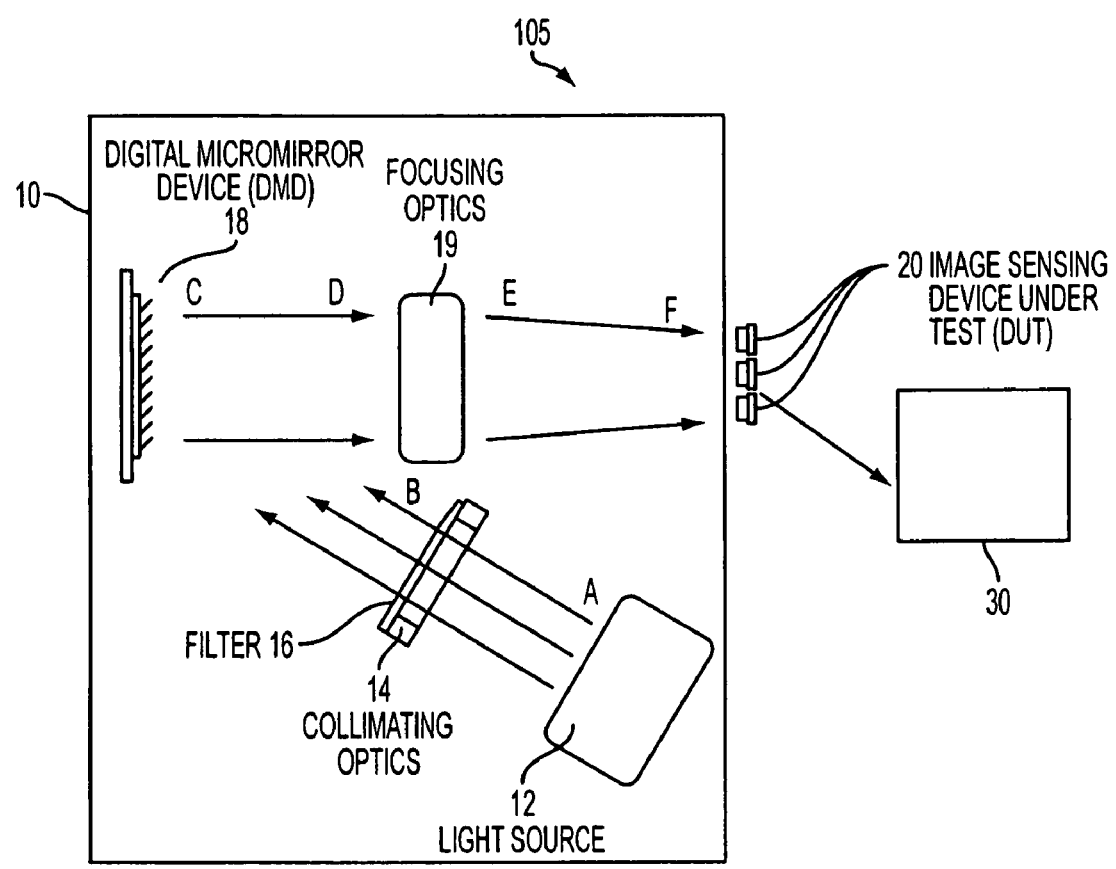
FIG. 4(a) is a diagram of an exemplary image sensor testing apparatus according to another embodiment of the present invention.
Figure 6:
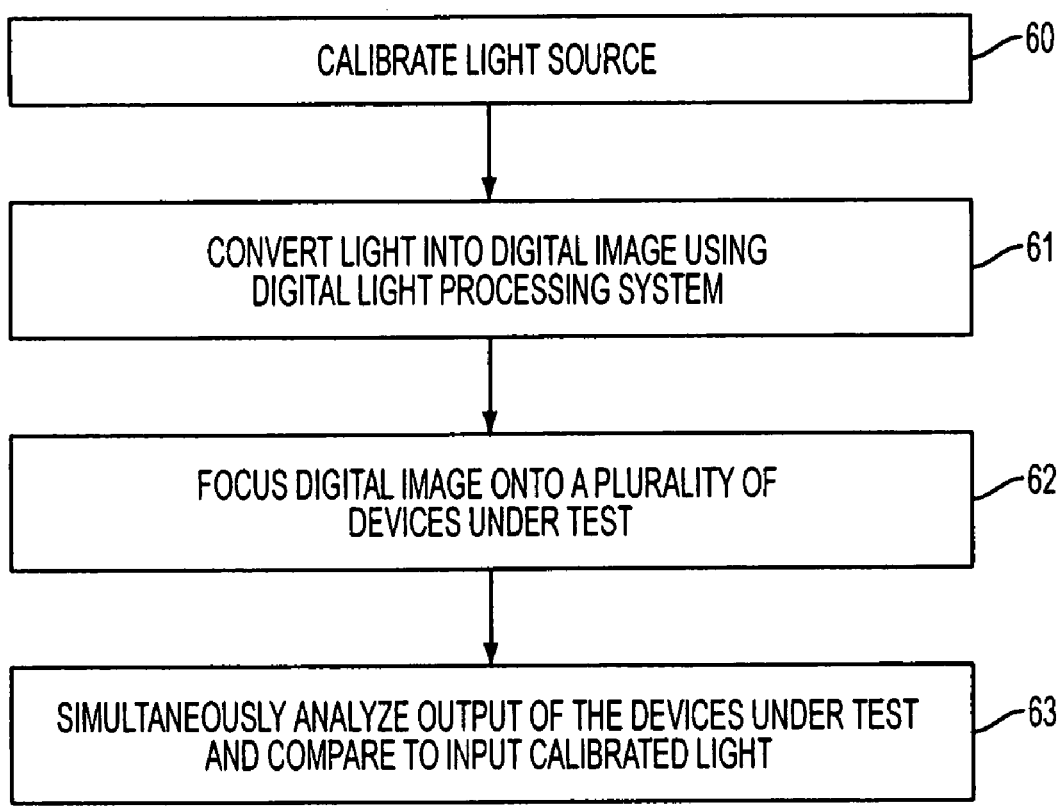
FIG. 6 is a block diagram of another exemplary method of testing image sensors according to the present invention.

In accordance with a third exemplary method embodiment of testing image sensors of the invention, a plurality of image sensors is tested simultaneously by using a digital light projection system 10 to project a single image over a plurality of devices under test 20, as described above and shown in FIG. 4(a). FIG. 6 is a block diagram illustrating the third exemplary method of testing image sensors according to the invention. Referring now to FIG. 6 and FIG. 4(a), a light source 12 is calibrated, block 60, and then converted into a desired digital image using a digital light processing system 18, as shown at block 61. The digital image is then projected onto a plurality of devices under test, block 62. Thus, the resolution of the micromirror array must be greater than the total resolution of the devices under test. The devices under test may be aligned with space between each device, as any light from the digital light processing system that falls between the devices under test will not affect the test. If static test images are used, the devices under test must be aligned such that the edge between light and dark image sections correspond to two adjacent pixel rows or columns on each device under test. Finally, as shown at block 63, the image sensor signal detection means 30 then simultaneously analyzes the output of all devices under test 20, thus automating the method of testing multiple image sensors.

Figure 4B:
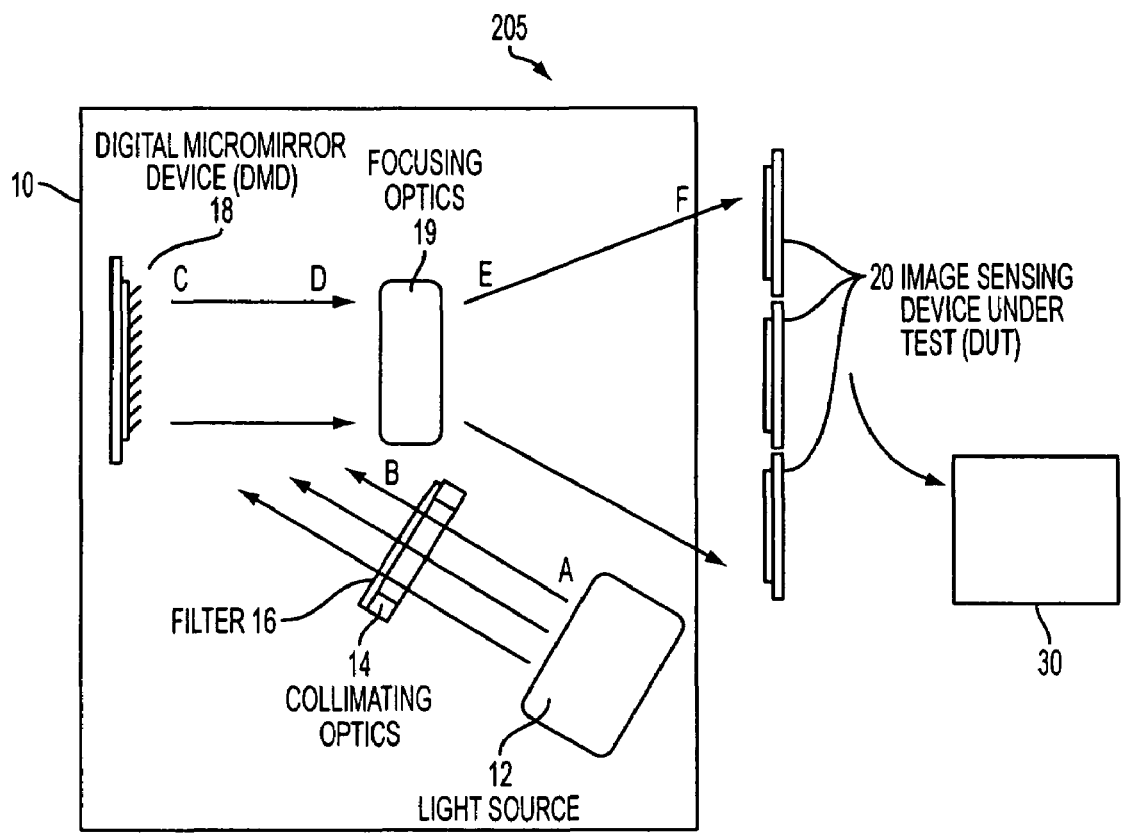
FIG. 4(b) is a diagram of an exemplary image sensor testing apparatus according to another embodiment of the present invention.
Figure 7:
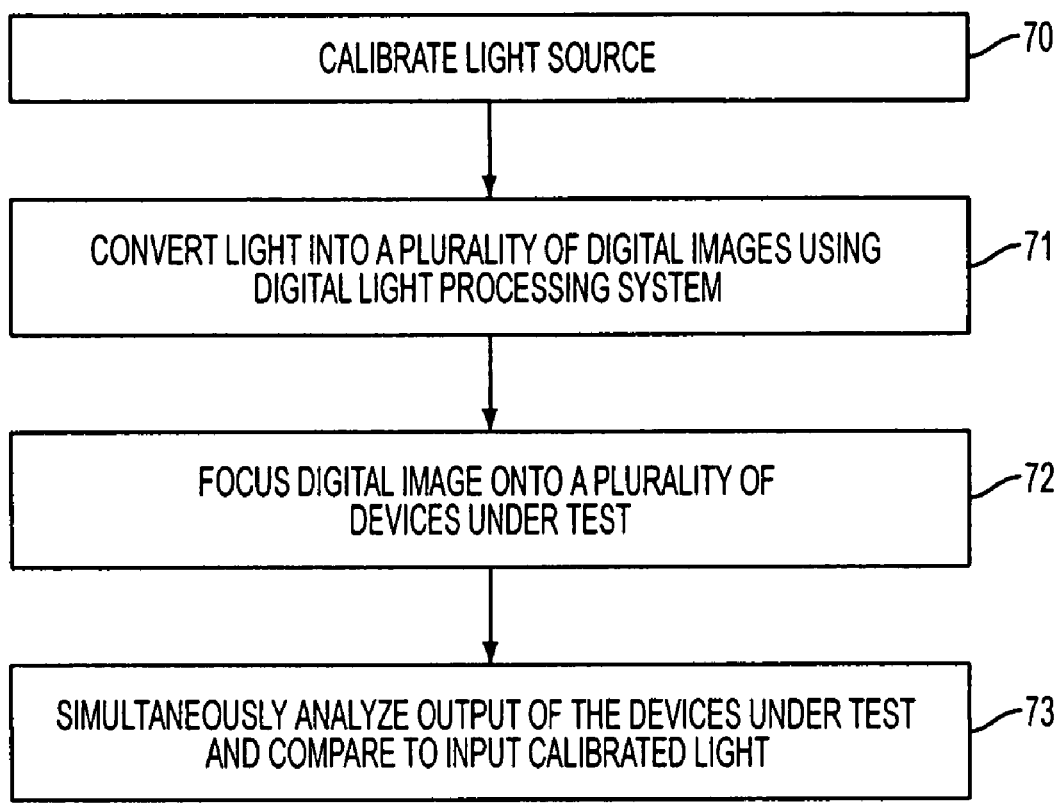
FIG. 7 is a block diagram of another exemplary method of testing image sensors according to the present invention.

In accordance with a fourth exemplary method embodiment of testing image sensors of the invention, a plurality of image sensors is tested simultaneously by using a digital light projection system 10 to simultaneously create multiple test images, as described above and shown in FIG. 4(b). FIG. 7 is a block diagram illustrating the fourth exemplary method of testing image sensors according to the invention. Referring now to FIG. 7 and FIG. 4(b), a light source 12 is calibrated, block 70, and then converted into multiple digital images using a digital light processing system 18, as shown at block 71. The digital light projection system, for example, may create multiple test images 10 by utilizing focusing optics 219 capable of splitting the image from the digital micromirror device into a plurality of images. The digital test images are then focused onto a plurality of devices under test such that only one of the test images is projected onto each device under test, block 72. Finally, as shown at block 73, the image sensor signal detection means 30 then simultaneously analyzes the output of all devices under test 20, thus automating the method of testing multiple image sensors.

While separate exemplary apparatus and method embodiments of the invention have been described and illustrated, practice of the present invention is not limited to use of only one of these exemplary embodiments. One or more of the embodiments of the present invention can be used separately or together to detect defects in an image sensor.

Furthermore, while exemplary embodiments of the invention have been described and illustrated, various changes and modifications may be made without departing from the spirit or scope of the invention. Accordingly, the invention is not limited by the foregoing description, but is only limited by the scope of the appended claims.

What is claimed as new and desired to be protected by Letters Patent of the United States is:

1. An apparatus for testing image sensors, said apparatus comprising:
  a digital light processing control system capable of generating digital test images and directing said images onto at least one image sensor;
  focusing optics capable of splitting one of said digital test images into a plurality of images; and
  an image sensor signal detector for detecting a signal from said at least one image sensor.

2. The apparatus of claim 1, wherein said test images are static images.

3. The apparatus of claim 1, wherein said test images are dynamic images.

4. The apparatus of claim 3, wherein said dynamic test images comprise one or more images selected from the group consisting of marching rows, marching diagonals, and alternating checkerboards.

5. The apparatus of claim 1, wherein said digital light processing control system comprises a light source; a digital micromirror device, for converting light from said light source into a digital test image; collimating optics, for directing light from said light source onto said digital micromirror device.

6. The apparatus of claim 5, wherein said light source is a uniform DC light source.

7. The apparatus of claim 5, wherein said digital light processing control system further comprises filter optics, for filtering light from said light source before it is directed to said digital micromirror device.

8. The apparatus of claim 1, wherein each of a plurality of said digital test images is split by said focusing optics.

9. The apparatus of claim 8, wherein said plurality of images is a plurality of identical images.

10. An apparatus for simultaneously testing a plurality of image sensors, said apparatus comprising:
a digital light processing control system comprising an image generator for generating static and dynamic digital test images and a test image director for simultaneously directing one of said static and dynamic images onto a plurality of image sensors; and
an image sensor signal detector for sensing respective signals from said image sensors,
wherein said digital light processing control system comprises:
a light source;
a digital micromirror device, for converting light from said light source into a digital test image;
collimating optics, for directing light from said light source onto said digital micromirror device; and
focusing optics, for focusing said digital test image onto image sensors and
wherein said focusing optics are capable of splitting each of said directed digital test images into a plurality of identical images.

11. An apparatus for automated image sensor testing, said apparatus comprising:
a digital light processing control system comprising:
a light source;
a digital micromirror device, for converting light from said light source into at least one of a static and dynamic digital test image;
collimating optics, for directing light from said light source onto said digital micromirror device; and
focusing optics, for focusing a digital test image onto an image sensor device under test; and
an image sensor signal detector comprising;
an input means, for inputting a continuous signal from an image sensor device under test; and
a means for automatically comparing said signal from an image sensor device under test to said test images inputted by said digital light processing control system,
wherein said digital light processing control system is capable of testing a plurality of image sensors using a plurality of test images, and
wherein said focusing optics are capable of splitting said test image into a plurality of identical test images.

12. A method of testing image sensors comprising:
generating a digital test image;
splitting said digital test image into a plurality of images;
applying one of said plurality of images on to at least one image sensor;
inputting a first signal from said image sensor; and
correlating said digital test image to said first signal from said image sensor.

13. The method of claim 12, wherein said digital test image is a static image.

14. The method of claim 12, wherein said digital test image is a dynamic image.

15. The method of claim 14, wherein said dynamic test image comprises one or more images selected from the group consisting of marching rows, marching diagonals, and alternating checkerboards.

16. The method of claim 12, wherein generating a digital test image is performed by a digital light processing control system.

17. The method of claim 16, wherein said digital light processing control system comprises a light source; a digital micromirror device, for converting light from said light source into a digital test image; collimating optics, for directing light from said light source onto said digital micromirror device; and focusing optics, for focusing said digital test image onto an image sensor.

18. The method of claim 17, wherein said digital light processing control system further comprises filter optics, for filtering light from said light source before it is directed to said digital micromirror device.

19. The method of claim 12, wherein inputting a first signal from said images sensors and correlating said digital test image to said first signal are performed by an image sensor signal detector.

20. The method of claim 12, wherein applying said test image to an image sensor further comprises applying said test image to a plurality of image sensors.

21. The method of claim 12, wherein generating a digital test image further comprises generating a plurality of digital test images.

22. The method of claim 17, wherein said focusing optics are capable of splitting said digital test images into a plurality of identical test images.

23. A method of simultaneously testing a plurality of image sensors comprising:
generating a plurality of digital test images using a digital light processing control system;
applying an identical generated image onto each of a plurality of image sensors;
inputting a plurality of signals from said image sensors; and
correlating said input digital test images to said input signals from said image sensors.

24. The apparatus of claim 23, wherein said test images are static images.

25. The apparatus of claim 23, wherein said test images are dynamic images.

26. The method of claim 23, wherein said digital light processing control system comprises a light source; a digital micromirror device, for converting light from said light source into a digital test image; collimating optics, for directing light from said light source onto said digital micromirror device; and focusing optics, for focusing said digital test image onto an image sensor.

27. The method of claim 26, wherein said digital light processing control system further comprises filter optics, for filtering light from said light source before it is directed to said digital micromirror device.

28. The method of claim 26, wherein the act of applying an identical generated image comprises splitting at least one of said digital test images into a plurality of identical test images.

29. The method of claim 23, wherein inputting a first signal from said images sensors and correlating said digital test image to said first signal are performed by an image sensor signal detector.

* * * * *